L. SCUSA.
MICROMETER GAGE.
APPLICATION FILED MAR. 31, 1909.
981,127. Patented Jan. 10, 1911.
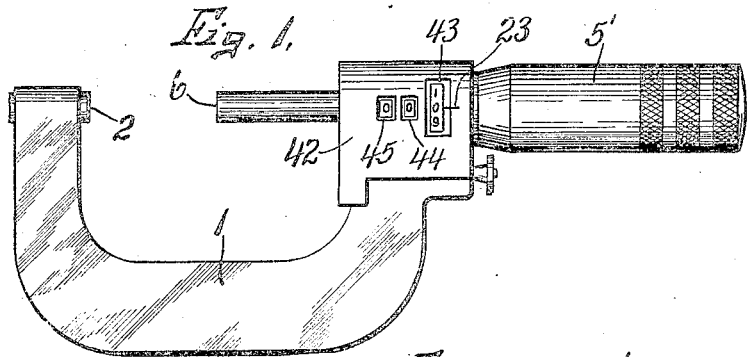
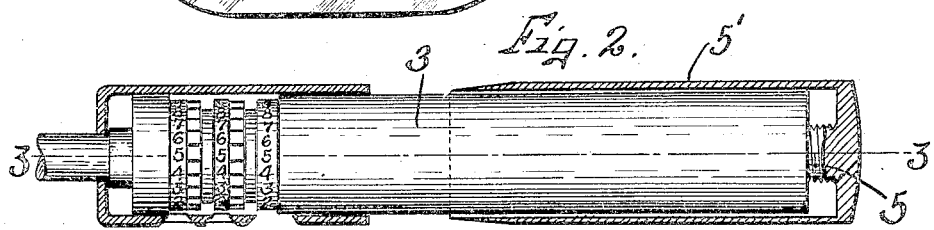
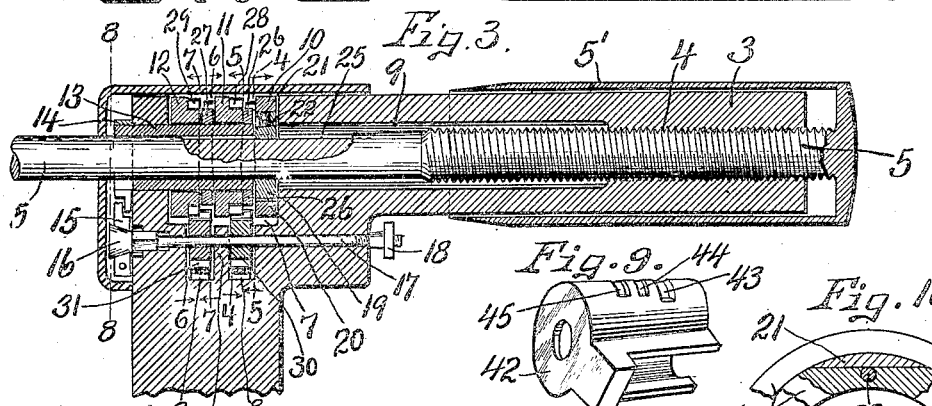
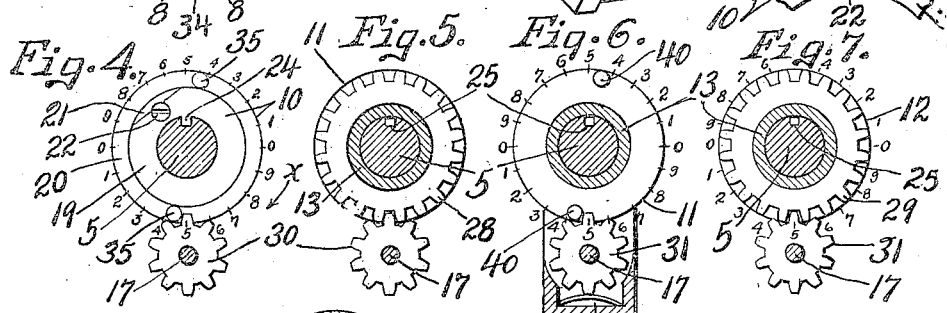
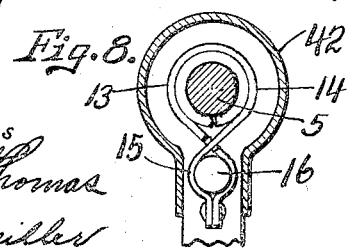
Witnesses
T. C. Thomas
Jos Miller
Inventor
Lino Scusa
By Howard P. Denison
Attorney

UNITED STATES PATENT OFFICE.

LINO SCUSA, OF SYRACUSE, NEW YORK.

MICROMETER-GAGE.

981,127. Specification of Letters Patent. Patented Jan. 10, 1911.

Application filed March 31, 1909. Serial No. 486,991.

*To all whom it may concern:*

Be it known that I, LINO SCUSA, of Syracuse, in the county of Onondaga, in the State of New York, have invented new and useful Improvements in Micrometer-Gages, of which the following, taken in connection with the accompanying drawings, is a full, clear, and exact description.

This invention relates to certain improvements in micrometer gages of the caliper type involving the use of an internally threaded barrel in which is movable a screw threaded spindle having a predetermined number of threads per inch and provided at one end with a sleeve telescoping with the barrel and movable lengthwise thereof so that by properly graduating the relatively movable parts, the exact distance between the end of the spindle and opposed abutment may be visually indicated by the graduations.

Heretofore it has been customary to provide the barrel with a number of lengthwise graduations corresponding to the number of threads per inch on the threaded sleeve, such graduations being subdivided into tenths numbered from 0 to 0 including the digitals, while the sleeve is provided with a circular series of graduations corresponding in number to the number of thousandths per inch from point to point of adjacent threads on the spindle and numbered accordingly. The graduations upon the barrel are necessarily close together, which necessitates close inspection for accurate reading, and it not infrequently happens that such reading is erroneous owing principally to the fact that the end edge of the sleeve must necessarily cover the graduation with which it registers, making it necessary for the operator to count the unnumbered graduations from the nearest numeral in sight.

My main object is to avoid this liability to error by using one or more rotary numbered disks actuated by the spindle to bring the numerals successively in registration with suitable sight openings, whereby the smallest measurement may be read in numbers instead of by counting the number of graduations from the nearest numeral, as in the usual gage of this character. In other words, instead of the vernier graduations on the barrel and sleeve, I employ a series of, in this instance, 3 rotary disks arranged end to end around a portion of the rotary threaded spindle, and each provided preferably upon its periphery with a circular series of graduations spaced equal distances apart and corresponding in number to the number of thousandths of an inch representing the pitch of the tread of the spindle. For example, if the pitch of the thread is .020 of an inch, as in the present instance, the periphery of the disks would be divided into 20 equal parts or graduations. If the pitch is .030 of an inch there would be 30 subdivisions or graduations, and if the pitch is .040, the periphery of the disk would be divided into 40 graduations, and so on a thread of any pitch which is a multiple of 10 may be employed, the corresponding graduations upon the disks being divided into series of 10 each numbered consecutively through the digital range from 0 to 0 inclusive. That is, if the pitch of the thread is .020 and the periphery of each disk is divided into 20 equal spaces or graduations, such graduations will be divided into two series of 10 each numbered through the digital range from 0 to 0 inclusive, and if the pitch of the thread is .030, the periphery of each disk would be divided into 30 equal spaces or graduations arranged in series of 10 each, those of each series being also numbered through the digital range from 0 to 0 inclusive, in order that the consecutive numerals of successive counter-disks may be registered in sequence with their corresponding sight openings to indicate adjustment of the micrometer in numerals, as tenths, hundredths and thousandths of an inch.

Another object of my invention is to provide a simple mechanism for transmitting rotary motion from the threaded spindle to the several disks.

A further object is to provide means for frictionally clamping the rotary spindle against rotation when desired.

Other objects and uses relating to specific parts of the device will be brought out in the following description:

In the drawings—Figure 1 is a side elevation of the micrometer embodying the various features of my invention. Fig. 2 is an enlarged top plan or edge view of the same showing the sleeve and apertured cap in section. Fig. 3 is an enlarged longitudinal section view taken on line 3—3, Fig. 2. Figs. 4, 5, 6 and 7 are transverse sectional views taken respectively on lines 4—4, 5—5, 6—6 and 7—7, Fig. 3, looking in the directions indicated by the arrows. Fig. 8 is a sectional view taken on line 8—8, Fig. 3. Fig. 9 is a perspective view of the detached cap for concealing the gears and greater portions of the disks. Fig. 10 is an enlarged detailed sectional view of a portion of the sectional disk showing means for clamping the sections together.

This micrometer comprises a U-shape bar —1— having one arm provided with a suitable stop —2— and its other arm provided with a cylindrical extension or barrel —3—. The outer end of the barrel —3— is threaded interiorly at —4— and is engaged by a threaded spindle —5— extending entirely through the barrel from end to end in alinement with the rest or stop —2—, the inner end of the spindle —5— forming an opposed stop or abutment —6— co-acting with the rest —2— to measure any object which may require close measurement.

The inner end of the barrel or adjacent portion of the bar —1— is provided with a transverse cutout or recess —7— and additional branch channels or recesses —8—, the recess —7— extending inwardly from the end of the bar —1— adjacent to the barrel —3— and across the lengthwise opening or bore, as —9—, which extends through the barrel from end to end, said recess —7— receiving a series of, in this instance, 3 circular disks —10—, —11— and —12—.

A hollow sleeve or bushing —13— is firmly secured in the inner end of the barrel —3— or adjacent end of the bar —1— in alinement with the bore —9—, and forms a convenient bearing for the inner end of the spindle —5—. This bushing —13— extends inwardly across the recess —7— to a point in close proximity to the inner face of the disk —10—, and its outer end extends a short distance beyond the inner face of the adjacent end of the bore —9— or barrel —3—, and is preferably split lengthwise forming jaws which are adapted to be frictionally clamped upon the spindle —5— by means of a friction band —14— to lock the spindle —5— against rotation when desired. This band, which is more clearly shown in Fig. 8, encircles the greater portion of the adjacent split end of the bushing —13— and its opposite ends are crossed and returned to a point in close proximity to each other, forming an open loop —15— for receiving a tapering head —16— of a clamping bolt —17—. This bolt —17— is journaled in the adjacent end of the bar —1— at one side of the barrel —3— and its outer end is threaded and engaged by a suitable end nut —18— by which the bolt —17— may be moved endwise to frictionally engage the tapering head —16— with the friction band —14— for clamping the split end of the bushing —13— upon the spindle —5— when it is desired to hold the spindle against rotation or in its adjusted position.

The disk —10— is composed of inner and outer rings —19— and —20— fitting with a snug but turning fit one within the other, and adapted to be frictionally locked together by a segmental friction key —21— and tapering bolt —22—, as best seen in Figs. 3 and 10. The object in making this disk in sections or separate rings is to permit the outer ring which bears the graduations to properly register such graduations with a fixed graduation, as —23— on the periphery of the adjacent end of the barrel —3—. This disk —10— is mounted directly upon the spindle —5— to rotate therewith, and for this purpose the inner ring —19— is formed with a key —24— which rides in a keyway —25— in the spindle —5—, thereby locking the disk —10— to the spindle and at the same time permitting such spindle to move endwise as it is rotated in the threaded portion —4— of the barrel —3—.

The disks —11— and —12— are rotatingly mounted upon the inner end of the bushing —13— and are spaced apart from each other and from the disk —10— by intervening washers —26— and —27— which are also mounted upon the inner end of the bushing —13—. The outer ends of the disks —11— and —12— are provided with gears —28— and —29— rotating therewith and meshing with suitable pinions —30— and —31— which are journaled end to end upon the bolt —17— within the branch channels or recesses —8—.

The pinions are spaced apart by an intervening web or partition —34— and are preferably somewhat wider than the gears —28— and —29— with which they mesh, so as to project axially toward the disks —10— and —11— respectively, some distance beyond the outer faces of their respective gears.

The disk —10— is provided with a plurality of, in this instance, two diametrically opposite laterally projecting studs or pins —35— arranged equidistant from the axis of said disk and positioned so as to mesh with the teeth of the corresponding pinion —30— as the disk —10— is rotated by the rotation of the spindle —5—, the latter being provided with a sleeve —5'— which telescopes with the outer end of the barrel —3— and serves as a convenient means for rotating the spindle.

The periphery of the disk —10— or rather of the ring —20— is divided by suitable graduations into a series of, in this instance, twenty equal spaces, said graduations being grouped in separate series of 10 in each group, those of each series being numbered consecutively by the digits from 0 to 9 inclusive, and an additional "0" indicating the tenth graduation of the series. It is, therefore, apparent that the periphery of the disk —10— is provided with, in this instance, two groups of numerals, those of each group embracing half of the periphery of the disk and numbered consecutively, 0, 1, 2, 3, 4, 5, 6, 7, 8, 9, 0, indicating ten subdivisions on each half of the disk. It may be stated here that these graduations and set of pinion operating studs —35— are arranged for a spindle having 50 threads to the inch, or a pitch of .020 of an inch, and, therefore, each graduation of the disk —10— represents .001 of an inch, and by locating the pins or studs —35— diametrically opposite to each other, as shown in Fig. 4, it is evident that the corresponding pinion —30— will be moved one tooth space at each half revolution of the spindle —5— and disk —10— secured thereto, thereby imparting a similar movement to the disk —11— having the gear —28— which meshes with the pinion —30—.

The peripheries of the disks —11— and —12— are graduated in the same manner as described for the disk —10—, the disk —11— being provided with diametrically opposite laterally projecting studs —40—, Fig. 6, which mesh with the corresponding pinion —31—, the latter in turn meshing with the gear —29— so that at each half revolution of the disk —11— the pinion —31— will be moved one tooth space, thereby imparting a similar degree of movement or rotation to the gear —29— and its corresponding disk —12—.

A hood or cap —42— is removably fitted upon the end of the bar —1— adjacent to the barrel —3—, to inclose and conceal the friction clamping device and gears, and greater portions of the disks, said cap being provided in one side with a series of sight openings —43—, —44— and —45— in registration with the peripheries of the corresponding disks —10—, —11— and —12—, the sight opening —43— being preferably elongated to enable the operator to read the numeral which may be in registration with the fixed graduation —23— and the adjacent numerals at either side of such numeral.

In all of the drawings I have shown the micrometer as set for "0" with the measuring abutments —2— and —6— spaced one inch apart, the spindle being at the limit of its inward movement.

Now assuming that we wish to set the instrument for measuring 1.009 inches, it will be simply necessary to turn the sleeve —5'— and spindle —5— to the left or in the direction indicated by arrow "X," Fig. 4, until the hidden numeral "9" assumes the position now indicated by "0" at the right hand of the same figure, or in registration with the sight opening —43— and fixed graduation —23—.

If it is desired to make the measurement 1.010 inches, the sleeve —5'— and spindle —5— will be rotated in the same direction, thereby rotating the disk —10— in the direction indicated by arrow "X", Fig. 4, until such disk completes a half revolution so that the "0" at the left is positioned to register with the graduation 23. During the movement of the disk —10— from the numeral "9" to the succeeding graduation "0" or "10" the upper pin —35— will have engaged and operated the pinion —30— one tooth space so that the stud —35— at the upper side of Fig. 4 will assume the same position as the stud at the lower side, thereby moving the gear —28— and corresponding disk —11— one tooth space or graduation from "0" to "1" bringing the numeral "1" of the disk —11— in registration with the sight opening —44— while the numeral "0" of the disk —10— will be in registration with the sight opening —43— and fixed graduation —23—. Now if this movement of the disk —10— is continued through another half revolution, the graduation "2" on the disk —11— will be brought into registration with the sight opening —44— at the same time that the numeral "0" of the disk —10— is registered with the fixed graduation —23—. It is now clear that at each complete revolution of the disk —10— the disk —11— will be moved two points and that when the disk —11— is moving from the ninth to the tenth point in the first half revolution, it will move the disk —12— one point through the medium of the studs or pins —40— and pinion —31—. It is thus apparent that in this instance at each half revolution of the spindle which rotates the disk —10— ten points, the movement of said disk from the ninth to the tenth point, will cause one of the pins or studs —35— thereon to engage and rotate the pinion —30— one tooth space, thereby moving the corresponding gear and disk —11— one tooth space or point, and by continuing the rotation of the spindle through the next half revolution, the opposite stud —35— will similarly engage and operate the pinion —30— a second time one tooth space, thereby moving the disk —11— to the second point or graduation marked "2" and at the same time the disk —11— will be brought into registration with the sight opening, thus registering .020 in numerals, which indicates the pitch of the thread or one complete revolution of the spindle. In like manner, during the rotation of the disk —11— ten points, the movement from "9" to "0" of the last space will cause one of the studs —40— to engage and rotate the corresponding pinion one tooth space, thereby similarly rotating the disk —12— one point or graduation, indicating tenths of an inch, it being understood that the disk —11— indicates hundredths, while the disk —10— indicates thousandths.

As a further illustration of the operation of my invention, suppose it is desired to adjust the instrument for 1.125 inches— this may be accomplished by rotating the spindle —5— and disk —10— feathered thereon, six revolutions and five points additional, the first five revolutions bringing the numeral "1" of the disk —12— into registration with its sight opening, while the next revolution brings the numeral "2" of the disk —11— into registration with the corresponding sight opening, and the additional movement of five points of the disk —10— will bring its numeral "5" into registration with the adjacent sight opening, thereby effecting a combined registration of 1, 2, 5, indicating thousandths of an inch, the stops or abutments being previously adjusted an inch apart. It is clearly evident, however, that the same principle applies to threads of any pitch which is divisible by 10, as, for example, if .030 of an inch pitch is employed, the disks would be graduated into 30 equal spaces numbered consecutively in groups of ten each through the digital series from "0" to "0" inclusive, in which case each of the disks —10— and —11— would be provided with three studs or pins —35— spaced equidistant apart so as to operate the next succeeding disk one point at each one third revolution of the spindle. In like manner, if the thread is of 40 pitch, the periphery of each disk would be divided into 40 equal spaces grouped into four series of ten each and each series numbered through the digital scale consecutively from "0" "0" inclusive, in which case each of the disks —10— and —11— would be provided with four of the studs —35— spaced equidistant apart and operating the next succeeding disks one point at each one quarter of a revolution of the spindle.

What I claim is—

1. In a micrometer gage, a substantially U-shaped bar having one of its arms provided with a barrel formed with a bore having a portion of its length screw-threaded, that arm provided with the barrel further having a recess intersecting said bore, a threaded spindle extending through said bore and recess, and provided with an integral sleeve inclosing a portion of said barrel, a rotary disk arranged within said recess and mounted directly upon and actuated by the spindle and provided with a circular series of numbered graduations, a second disk having a series of graduations arranged within said recess and in operative relation with respect to the first disk, a bearing for the second disk, means arranged within said arm and below said recess for intermittently operating said second disk, and means forming a part of said first disk and intermittently engaging with the actuating means for the second disk for operating said actuating means.

2. In a micrometer gage, a substantially U-shaped bar having one of its arms provided with a barrel formed with a bore having a portion of its length screw-threaded, that arm provided with the barrel further having a recess intersecting said bore, a threaded spindle extending through said bore and recess, and provided with an integral sleeve inclosing a portion of said barrel, a rotary disk arranged within said recess and mounted directly upon and actuated by the spindle and provided with a circular series of numbered graduations, a second disk having a series of graduations arranged within said recess and in operative relation with respect to the first disk, a bearing for the second disk, means arranged within said arm and below said recess for intermittently operating said second disk, means forming a part of said first disk and intermittently engaging with the actuating means for the second disk for operating said actuating means, and a cap mounted upon said arm and provided with exposure openings for said graduations and further provided upon its periphery with a fixed graduation.

3. In a micrometer gage, a substantially U-shaped bar having one of its arms provided with a barrel formed with a bore having a portion of its length screw-threaded, that arm provided with the barrel further having a recess intersecting said bore, a threaded spindle extending through said bore and recess, and provided with an integral sleeve inclosing a portion of said barrel, a rotary disk arranged within said recess and mounted directly upon and actuated by the spindle and provided with a circular series of numbered graduations, a second disk having a series of graduations arranged within said series and in operative relation with respect to the first disk, a bearing for the second disk, means arranged within said arm and below said recess for intermittently operating said second disk, means forming a part of said first disk and intermittently engaging with the actuating means for the second disk for operating said actuating means, and means engaging with the bearing of the second disk for fixing said spindle in its adjusted position.

4. In a micrometer gage, a substantially U-shaped bar having one of its arms provided with a barrel formed with a bore having a portion of its length screw-threaded, that arm provided with the barrel further having a recess intersecting said bore, a threaded spindle extending through said bore and recess, and provided with an integral sleeve inclosing a portion of said barrel, a rotary disk arranged within said recess and mounted directly upon and actuated by the spindle and provided with a circular series of numbered graduations, a second disk having a series of graduations arranged within said recess and in operative relation with respect to the first disk, a bearing for the second disk, means arranged within said arm and below said recess for intermittently operating said second disk, means forming a part of said first disk and intermittently engaging with the actuating means for the second disk for operating said actuating means, a cap mounted upon said arm and provided with exposure openings for said graduations and further provided upon its periphery with a fixed graduation, and means engaging with the bearing of the second disk for fixing said spindle in its adjusted position.

In witness whereof I have hereunto set my hand this 24th day of March 1909.

LINO SCUSA.

Witnesses:
H. E. CHASE,
J. M. HOES